US010689798B2

(12) United States Patent
Kramer et al.

(10) Patent No.: US 10,689,798 B2
(45) Date of Patent: Jun. 23, 2020

(54) TEXTILE FABRIC FOR PREVENTING THE PENETRATION AND THE SPREADING OF WATER IN CABLES

(71) Applicant: Carl Freudenberg KG, Weinheim (DE)

(72) Inventors: Dominic Kramer, Frankfurt (DE); Ulrich Schneider, Darmstadt (DE); Gerald Jarre, Weinheim (DE); Matthias Schuster, Weinheim (DE); Nermina Zaplatilek, Birkenau (DE); Marco Sutter, Weinheim (DE); Iain Smith, Watchfield Swindon (GB)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 15/508,498

(22) PCT Filed: Sep. 1, 2015

(86) PCT No.: PCT/EP2015/069940
§ 371 (c)(1),
(2) Date: Mar. 3, 2017

(87) PCT Pub. No.: WO2016/034578
PCT Pub. Date: Mar. 10, 2016

(65) Prior Publication Data
US 2017/0298568 A1    Oct. 19, 2017

(30) Foreign Application Priority Data

Sep. 4, 2014  (DE) .................. 10 2014 012 888

(51) Int. Cl.
*H01B 7/288*     (2006.01)
*D06M 15/263*   (2006.01)
(Continued)

(52) U.S. Cl.
CPC ........ *D06M 15/263* (2013.01); *D06M 10/001* (2013.01); *D06M 10/10* (2013.01);
(Continued)

(58) Field of Classification Search
CPC .... H01B 7/288; D06M 15/263; D06M 14/26; G02B 6/44; G02B 6/4494
(Continued)

(56) References Cited

U.S. PATENT DOCUMENTS 4,867,526 A    9/1989  Arroyo
4,938,560 A *  7/1990  Arroyo ................. G02B 6/443
                                               385/107
(Continued)

FOREIGN PATENT DOCUMENTS

CN    1349228 A    5/2002
CN    102596393 A  7/2012
(Continued)

*Primary Examiner* — Brian K Talbot
(74) *Attorney, Agent, or Firm* — Leydig, Voit & Mayer, Ltd.

(57) ABSTRACT

A textile fabric for preventing the penetration and water spreading in cables, having at least one layer, which is at least partially covered by an absorbent material and has pores, which pores can be at least partially closed under the effect of liquid due to absorbent material swelling, the absorbent material being bonded to the textile layer, at least in some areas, has a DIN ISO 9073-3 tensile strength in machine direction of >50 N/5 cm, and obtainable by a method involving: treating a layer containing pores with a mixture containing a polymerizable monomer or oligomer and a cross-linking agent and, as absorbent material precursor, a wetting agent and initiator, and polymerization of the monomer or oligomer under formation of a bonded connection between the absorbent material and the layer. The textile
(Continued)

fabric can have a DIN EN ISO 9237 air permeability in dry state of greater than 200 dm$^3$/(m$^2$s).

5 Claims, 7 Drawing Sheets

(51) Int. Cl.
  *D06M 10/10* (2006.01)
  *D06M 10/00* (2006.01)
  *D06M 14/26* (2006.01)
  *B05D 7/20* (2006.01)
  *G02B 6/44* (2006.01)

(52) U.S. Cl.
  CPC ............ *D06M 14/26* (2013.01); *H01B 7/288* (2013.01); *B05D 7/20* (2013.01); *G02B 6/44* (2013.01); *G02B 6/4494* (2013.01)

(58) Field of Classification Search
  USPC .......................................................... 427/117
  See application file for complete search history.

(56) References Cited

U.S. PATENT DOCUMENTS

| | | | |
|---|---|---|---|
| 5,131,064 A * | 7/1992 | Arroyo ................ | G02B 6/4432 174/20 |
| 5,204,175 A | 4/1993 | Umeda et al. | |
| 5,298,284 A | 3/1994 | Buckwald et al. | |
| 6,003,565 A * | 12/1999 | Whittier, II ............ | D03D 15/00 139/420 A |
| 6,103,317 A | 8/2000 | Asai et al. | |
| 2003/0124350 A1 | 7/2003 | Rebouillat et al. | |
| 2012/0209231 A1 | 8/2012 | Rudolf et al. | |
| 2016/0010274 A1 | 1/2016 | Jarre et al. | |

FOREIGN PATENT DOCUMENTS

| | | | | |
|---|---|---|---|---|
| DE | 4134370 A1 | 1/1993 | | |
| DE | 3882332 T2 | 1/1994 | | |
| DE | 69609828 T2 | 2/2001 | | |
| DE | 102013003755 A1 | 9/2014 | | |
| EP | 0314991 A1 | 5/1989 | | |
| EP | 0500296 | * | 2/1992 | ............... G02B 6/44 |
| EP | 0500296 A1 | 8/1992 | | |
| JP | H 01292180 A | 11/1989 | | |
| JP | H 0290414 A | 3/1990 | | |
| JP | H 03287871 A | 12/1991 | | |
| JP | H 0580237 A | 4/1993 | | |
| JP | H 0813342 A | 1/1996 | | |
| JP | H 10211429 A | 8/1998 | | |
| JP | H 2003528986 A | 9/2003 | | |
| KR | 100585926 B1 | 6/2006 | | |
| WO | WO 00/31752 | * | 6/2000 | ............... G02B 6/44 |
| WO | WO 0031752 A2 | 6/2000 | | |

* cited by examiner

TEXTILE FABRIC FOR PREVENTING THE PENETRATION AND THE SPREADING OF WATER IN CABLES

CROSS-REFERENCE TO RELATED APPLICATIONS

This application is a U.S. national stage application under 35 U.S.C. § 371 of International Application No. PCT/EP2015/069940, filed on Sep. 1, 2015, and claims benefit to German Patent Application No. DE 10 2014 012 888.1, filed on Sep. 4, 2014. The International Application was published in German on Mar. 10, 2016, as WO 2016/034578 A1 under PCT Article 21(2).

FIELD

The invention relates to a water-blocking textile fabric. The invention further relates to a method for producing the textile fabric and to the use thereof for preventing the penetration and the spreading of water in cables.

BACKGROUND

Cable systems, for example underground cable systems, including power (energy) cables or data communications and telecommunications cables and in particular cable systems passing through water, are very sensitive to damage and destruction wherein water penetrates into the cable core and spreads along the cable. Considerable damage and complete failures of the functionality of the cable systems can be caused thereby.

Many cable products are endowed with one or more water-blocking protective layers for protection against the penetration and the spreading of water. For example, water-tight sheaths, water-blocking layers, which are inserted between a central core and a core or sheath, water-blocking yarns, water-blocking tapes and combinations thereof are used for this. Such water-blocking protective devices act against penetration of water in the direction of areas of the central core, which for example contains optical fibers, and spreading of the water along the cable axes which would lead to damage of further sections of the cable.

Layered water-blocking tapes have the disadvantage that during cable production the active water-blocking compounds can sometimes be partially lost for example by mechanical abrasion. In order to prevent this, water-blocking tapes are often sealed or bonded with adhesives and adhesives. However, such adhesives and adhesives are disadvantageous, since they inhibit the swelling action and swelling rate of the water-blocking compounds and thus impair the water-blocking properties of the tapes. In addition, the use of binders increases the weight of the coated materials. Water-soluble binders and adhesives are normally used. As a result of this, the binder dissolves on contact with water and the water-blocking compound begins to swell. As a result, the water-blocking agent loses its attachment to the substrate and can thus be flushed out in the event of damage to the cable and under water pressure can migrate along cavities in cables.

DE 4134370C1 describes a swellable cable band layer, consisting of a nonwoven which is coated with super-absorbers in powder form by means of an adhesive. In this publication, the problem of powder attachment by means of a binder is discussed with regard to the free swellability or degree of swelling for cable use. A compromise between powder attachment and swellability is proposed.

Consequently it would be desirable to obtain a textile fabric with which the spreading of water in cables can be effectively prevented. The textile fabric should as far as possible do without adhesives and/or adhesives, in order to maximize the swelling action and swelling rate. Further, it would be desirable for the textile fabric to have a low weight and sufficient flexibility for use in a wide variety of cable configurations.

Also known is the use of fibers which consist of super-absorbers (SAP fibers). However, a disadvantage with these fibers is that in the swelled state they display low gel strength. The SAP fibers are also not firmly bound in or around the matrix fibers. Under hydrostatic pressure, the gel migrates very rapidly along cavities in the cable.

From DE 000069609828 T2, a water-blocking composite material is known, comprising a substrate which is coated with a mixture of an irradiation-polymerized compound and a compound swellable in water. As substrates, fibers (glass fibers, yarns, optical fibers), wires or rods (e.g. components subject to cable drawing) or tubes (e.g. polymer cable sheathings or buffer sheaths) or other articles are used. These are endowed with the swellable compound and a coating of variable thickness is thus formed. With the formation of coatings as described in this publication, it is disadvantageous that such composite materials are only to a limited extent suitable for preventing the spreading of water in the longitudinal direction along the cable. In particular, the composite materials have a rather low swelling—and thus blocking—rate. In addition, no firm bonding to the substrate can be achieved through the application of the swellable compound as a coating. This leads to detachment of the swellable compound during production and/or in use, for example on contact with water.

SUMMARY

An aspect of the invention provides a textile fabric for preventing penetration and water spreading in cables, the fabric comprising: a layer, at least partially covered by an absorbent material, the layer comprising pores configured to be at least partially closed under an effect of liquid due to a swelling of the absorbent material, wherein the absorbent material is bonded to the textile layer at least in some areas, wherein the absorbent material has a tensile strength in the machine direction of more than 50 N/5 cm, measured according to DIN ISO 9073-3, and wherein the textile fabric has an air permeability according to DIN EN ISO 9237 in a dry state of more than 200 $dm^3/(m^2 s)$.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
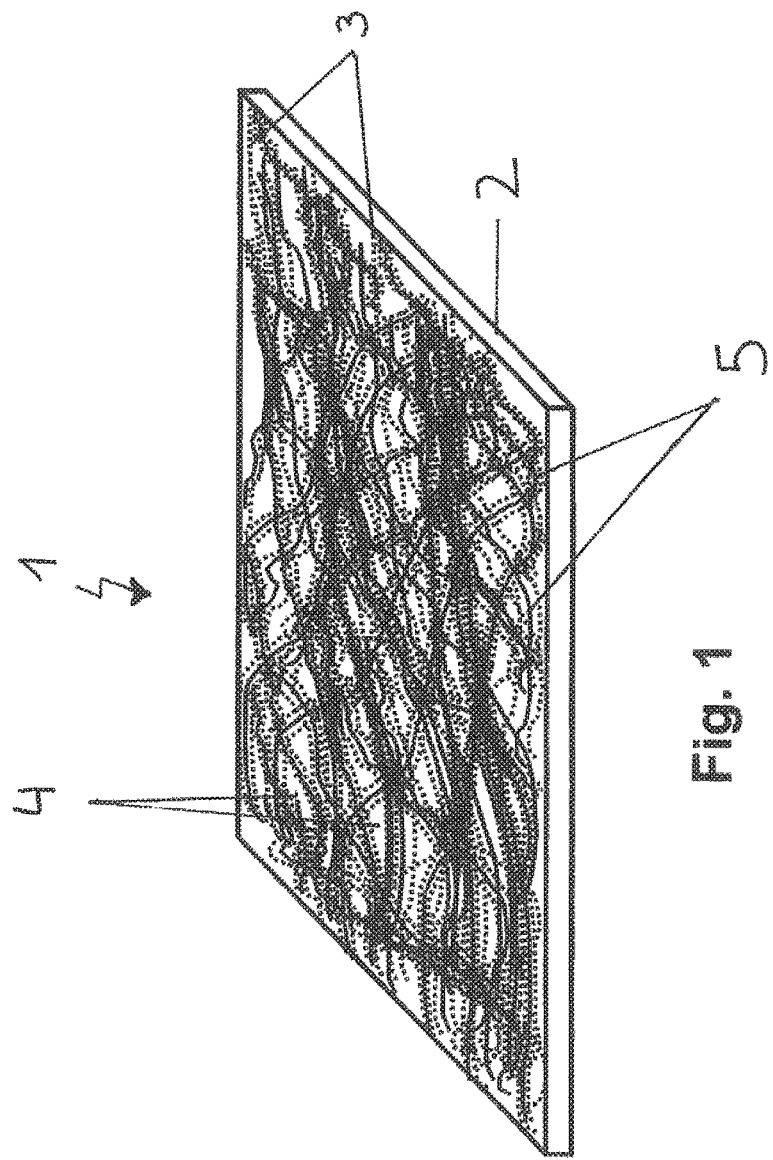
FIG. 1 is a schematic view of a textile fabric with complete coating.

An aspect of the invention is therefore to provide a water-blocking textile fabric which no longer displays the aforesaid disadvantages of the prior art. In particular, a textile fabric is to be provided wherein the use of super-absorbers in powder form and adhesives can be dispensed with and which, simultaneously with inexpensive production, can when used in and/or on cables effectively act against the spreading of water in the longitudinal direction along the cable in case of damage.

Accordingly, the textile fabric mentioned at the outset is characterized in that it has an air permeability, measured according to DIN EN ISO 9237 at 100 Pa air pressure of more than 200 dm$^3$/(m$^2$s), preferably in the range from 300 to 5000 dm$^3$/(m$^2$s), more preferably from 500 to 3000 dm$^3$/(m$^2$s), and most preferably in the range from 800 to 2500 dm$^3$/(m$^2$s). The measurements of air permeability were performed before contacting with liquid with samples of thickness 0.1 to 3 mm, preferably 0.3 mm, an air-permeated sample area of 20 cm$^2$, at an air pressure difference of 100 Pa.

It was found that the textile fabric according to the invention, in spite of its high air permeability, makes it possible effectively to prevent the penetration and the spreading of water in the direction of the longitudinal axis of cables (high longitudinal impermeability).

For a person skilled in the art it was surprising that products with high air permeability display a good sealing action, since it was obvious to use for this purpose products which already have high impermeability in the dry state. The air permeability is a measure of the open porosity of the textile fabric. According to the invention, however, it was found that it is precisely the high air permeability and open porosity of the fabric which enable rapid and comparatively unhindered swelling of the absorbent and thus efficient sealing against the entry of water and sealing against the further transport of water along the longitudinal axis of the cable. Also surprising was the fact that the high air permeability and open porosity causes particularly good anchoring of the dry, but also of the swelled absorbent medium in the textile fabric. This results in especially effective longitudinal sealing, since a migration of the swelled absorbent medium under external water pressure is markedly restricted. As is known to a person skilled in the art, the high air permeability of the textile fabric can be adjusted by adjustment of various parameters, for example the choice of a suitable open-pored substrate, of process parameters during the application of the material, for example viscosity, the quantity of absorbent and implementation of a suitable after-treatment of the material (washing and drying, mechanical after-treatment).

Without committing to one mechanism according to the invention, it is surmised that according to the invention an interpenetrating network of fibers and cross-linked absorbent is formed, which at least partially can be firmly bonded onto the textile layer and thus can be firmly anchored even without the use of additional adhesives. Additional adhesive is understood to mean an adhesive which has been added to the polymerizable mixture during the production of the textile fabric, for example polymeric binders such as polyacrylates, polyvinyl alcohol, polyvinyl acetate, polyurethanes, styrene-butadiene rubber, nitrile-butadiene rubber and/or polymerizable comonomers such as vinyl compounds. This additional adhesive is preferably present in a quantity of less than 20 wt. %, preferably 0-10 wt. %, more preferably 0-5 wt. % and in particular about 0-3 wt. %, each based on the total weight of the textile fabric.

In principle however, it is conceivable for the fabric to contain an adhesive. This can be present to strengthen the nonwoven. For this, water-insoluble binders, for example polyacrylates, styrene-butadiene rubber or nitrile-butadiene rubber are advantageously used. From the prior art, it is known that for the use of super-absorbers in powder form, adhesive is additionally necessary for anchoring the powder on the textile fabric. Water-soluble polymeric binders, for example polyvinyl alcohol, are advantageously used for this in order to ensure the swellability of the super-absorber. With the concept according to the invention, the use of such an additional adhesive can be omitted. According to a preferred embodiment of the invention, the fabric according to the invention contains a proportion of water-soluble binders of less than 20 wt. %, preferably 0-10 wt. %, more preferably 0-5 wt. % and in particular about 0-3 wt. %, each based on the total weight of the textile fabric.

Practical experiments have shown that the absorbent retains its high strength even in the wet state (high gel strength). It is surmised that the good anchoring of the gel is at least partially caused by the high air permeability and open porosity of the textile fabric. Namely, this enables large area bonding of the absorbent. This is very advantageous, since under a hydrostatic pressure wedge, little gel transport takes place and the damage site can thus be spatially restricted to a small cable section. Moreover, it was found that on damage to the cable, the absorbent is only washed out to a slight extent.

Because of the particularly good sealing action of the textile fabric according to the invention, the application of the polymerizable mixture can also take place in the form of flat swatches, for example in the form of strips, by printing or spraying of the textile layer and the material usage can thus be markedly reduced, which decreases the weight of the cable overall.

In comparison to coatings containing absorbents, the use of a porous textile layer as base material results in the following advantages: The polymerization in the layer results in complete penetration of the matrix material, which results in strong bonding and low abrasion.

The textile layer displays a large surface area, which is decisive for rapid blocking. Particularly suitable for this are base materials which per se exhibit high air permeability or open porosity, e.g. chemically bonded or water jet-strengthened nonwovens. Thin, thermally strengthened nonwovens are in principle also suitable. However, they often display a rather compact surface structure which is difficult to endow with absorbent, so that a flat surface coating is instead obtained.

Compared with the use of absorbents in powder form on nonwovens, further advantages are found. Thus no additional polymeric binder has to be used for immobilizing the powder, which can impair the swellability of the material. Because of the firm binding of the absorbent into the matrix material, no covering layer has to be used in order to avoid powder abrasion. Because of the higher strength of the absorbent, at the same time a higher stability of the absorbent in the dry and wet state against chemical and thermal degradation is achieved. The introduction of additives, e.g. carbon black, fiber pulp, etc., into the absorbent is directly possible during production. The textile fabric is swellable on both sides. No gel blocking behavior occurs. Rather, the absorbent is freely swellable.

According to the invention, it has been found that because of the firm bonding of the absorbent material within the layer, the absorption capacity of the absorbent material is restricted and the pores can close in a self-sealing manner. The closure or self-sealing takes place in such a manner that because of its swelling the absorbent material completely or partially fills the pores and seals these against the passage of liquids and/or gases, preferably against the passage of water.

The textile fabric is further characterized by a tensile strength in the machine direction (MD) of more than 50 N/5 cm. This is advantageous, since a certain strength is necessary for the cable production process, in which the materials are applied for example as a wrapping. In principle, however, the tensile strengths can be adjusted to preferred values depending on the particular use purposes, for example from 80 to 1500 N/5 cm and/or from 100 to 1500 N/5 cm and/or from 150 to 800 N/5 cm, measured according to DIN ISO 9073-3. A high tensile strength is very advantageous for cable production, since the materials are as a rule applied under tensile stress, for example as a wrapping. According to a preferred embodiment of the invention, the textile fabric already has the aforesaid high tensile strengths in the machine direction at low thicknesses, for example less than 3 mm such as for example in the range from 0.1 mm to 2 mm.

The textile fabric can be manufactured in a variety of thickness ranges. This enables the use of a made-to-measure textile fabric with regard to a wide variety of applications. Thus for example the textile fabric can have thicknesses in the range from 0.1 to 3 mm, or 0.1 to 2 mm. For applications wherein the construction space or the available room is limited, the textile fabric must not lead to a marked increase in the cable diameter. In these cases, thicknesses of less than 1 mm, for example from 0.1 mm to 0.8 mm, or from 0.2 mm to 0.6 mm, measured according to DIN ISO 9073-2, are preferred. In certain cable applications, the textile fabric can additionally take on the function of a padding layer. Then thicknesses between 1.0 mm and 3.0 mm, for example 1.1 to 2.0 mm, or 1.2 to 1.8 mm, are preferred.

According to the invention, an absorbent material should be understood to mean a swellable, preferably liquid-swellable, in particular water-swellable material, which preferably can absorb at least about 10 times, in particular about 20 times and preferably about 30 times or more times its own weight in fluid. The absorbent material according to the invention is in principle suitable for the absorption of any liquids, such as in particular water, aqueous salt solutions, rainwater, seawater, ground water and/or condensation water. The absorbent material is preferably water-insoluble.

Because of the firm bonding, the absorbent material is securely located in the layer. Preferably, the layer according to the invention is a textile layer. This enables simple processing of the textile fabric during cable production.

Advantageously, because of the firm bonding, a single layer structure is possible. Furthermore, it is advantageous that the textile fabric because of its single layer structure is particularly flexible and movable and has a low thickness.

A further advantage is that the absorbent material layer stabilizes the textile layer and no additional reinforcing component is necessary.

The absorbent material can be used as an adhesive.

In addition, the variable adjustment of the quantity of absorbent material enables regulation of the absorbent capacity of the textile layer for liquid. Thereby, an optimal blocking behavior in the cable can be achieved and the weight and volume increase can be minimized with suitable adjustment.

Preferably, fibers of the layer are partially or completely coated with the absorbent material. Thereby, the absorbent material is applied onto the surface of the fibers as a firmly adhering layer. A coating can be a thin or thick layer, which continuously and cohesively surrounds or encloses the fibers. This enables good adhesion between the absorbent material and the fibers of the layer. Further, the thickness of the layer of absorbent material can be optimally adjusted.

The formation of a coating on the surface of the fabric itself is to be differentiated from the coating of the individual fibers. According to the invention, the formation of such a coating is in fact of little advantage if thereby the air permeability or open porosity of the fabric is reduced below the degree desired according to the invention. As discussed above, this in fact has an adverse effect on the swelling behavior of the absorbent.

Hence, the problem stated at the outset has been solved. The absorbent material can be present free of coating, that is to say, the absorbent material is not covered or enclosed by a covering layer. This enables rapid liquid absorption, since no passage of the liquid through the supporting or covering layer is involved.

The absorbent material used according to the invention on contact with liquid is capable of sealing the pores on account of a shape change, in particular a swelling and volume increase.

The textile layer could be constituted as fleece, nonwoven, fabric, knitted material and/or woven material. Thereby, a textile fabric with a particularly flat structure is obtained, and the textile fabric is easily deformable. This facilitates further processing of the textile fabric.

According to the invention, a nonwoven is preferably used. The use of a nonwoven is particularly preferred according to the invention. The fleece laying can be effected dry in a carding process or in a wet fleece process. Preferably the fleece laying takes place in such a manner that in the fleece a higher proportion of the fibers is oriented in the longitudinal direction (machine direction) than in the transverse direction (longitudinally laid fleece). This is advantageous since higher tensile strengths in the longitudinal direction can be achieved. To increase the tensile strengths, reinforcing threads could alternatively or additionally also be incorporated in the longitudinal direction. The reinforcement could be effected mechanically, chemically and/or thermally. Mechanical reinforcement can be effected by needlework techniques or by intertwining fibers of the layer by means of water jets and/or air. For cable applications, nonwovens of low thickness and high tensile strength are needed. Hence, reinforcement by means of needlework techniques appears rather disadvantageous for the use according to the invention in cable production.

In chemically bonded nonwovens, a fiber gauze could be provided with an adhesive or with the mixture used for the production of the textile fabric according to the invention by impregnation, spraying or by otherwise conventional application methods. Thereby, a sufficiently strong product with a high tensile strength can be produced, which is advantageous for the use according to the invention in cable products.

According to a preferred embodiment, the textile layer contains fibers selected from the group consisting of polyolefins, in particular polyphenylene sulfide, polyester, in particular polyethylene terephthalate, polybutylene terephthalate, polyamide, in particular polyamide 6.6 (Nylon®), polyamide 6 (Perlon®), polyvinyl chloride, polyacrylonitrile, polyimide, polytetrafluoroethylene (Teflon®), aramid, wool, cotton, silk, hemp, bamboo, kenaf, sisal, cellulose, soya, flax, glass, basalt, carbon or viscose fibers and mixtures thereof.

Particularly preferably, the textile layer contains fibers selected from the group consisting of polyethylene, polypropylene, polyamide, poly-p-phenylene terephthalamide, poly-m-phenylene terephthalamide, polyester, cotton or viscose fibers and mixtures thereof. Because of its good mechanical properties, thermal stability and low cost, polyester, and in particular polyethylene terephthalate, is particularly preferred according to the invention.

According to the invention, the textile layer has pores. The pores could be formed by pores which are present in the layer especially on the basis of the fiber structure. According to the invention, the textile fabric has a porosity according to ISO 8971-4 in the range from 50 to 95%, in particular in the range from 80 to 90%. Preferably, the fabric has a pore distribution with a smallest pore diameter from 2 to 20 micrometers, and/or an average pore diameter from 10 to 150 micrometers and/or a greatest pore diameter from 50 to 500 micrometers, measured according to ASTM E 1294-89, with galden as the measurement liquid and by means of a capillary flow porometer CFP-1200-AEXL.

It is further possible that the pores can be introduced by the formation of recesses and/or channels. As a result of the pores, after liquid uptake the absorbent material can extend in a spatially limited manner corresponding to the geometry of the pores and the weight and volume uptake of the textile fabric can be varied.

The pores could be randomly distributed. This enables rapid liquid uptake into the layer. Preferably, a local liquid uptake takes place within the ventilation aperture directly at the penetration site of the liquid.

Further, the pores could have a random geometric structure. As a result, capillary effects occur which lead to very rapid liquid uptake in the layer.

The weight per unit area can vary over wide ranges. Preferably, the textile fabric has a weight per unit area according to DIN EN 29073-1 from 20 to 400 g/m², preferably from 20 to 300 g/m², in particular from 30 to 250 g/m². Fabrics according to the invention with such weights per unit area have outstanding stability.

The textile fabric could contain no additionally introduced hydrophilic fibers, for example based on polyvinyl alcohol, polyacrylic acid, polyvinyl acetate or cellulose. The proportion of hydrophilic fibers additionally introduced based on the total weight of the textile fabric could be less than 100 wt. %, preferably less than 50 wt. %, especially preferably less than 25 wt. % and in particular 0 wt. %.

The textile fabric can be used as such as a sealing element in and/or around cables. For many use purposes, however, it can be advantageous to form the fabric as a composite material, for example as a laminate in combination with supporting and/or protective layers in the form of textiles, sheets or papers.

The invention also comprises a method for producing the textile fabric according to the invention, comprising the following method steps:
a) treating a layer containing pores with a mixture containing a polymerizable monomer or oligomer and a cross-linking agent, as precursor for the absorbent material, a wetting agent and an initiator, and
b) polymerizing the monomer or oligomer to the absorbent material with formation of an at least partially bonded connection between the absorbent material and the layer.

Surprisingly, it was found that through the use of a wetting agent, a surface tension of the mixture is influenced in such a manner that a bonded connection of the absorbent material with the layer takes place and the absorbent material is securely bonded with the layer. At the same time, the textile fabric is endowed with high air permeability and open porosity. As already described above, this high air permeability and open porosity results in good anchoring of the absorbent both in the dry and also in the wet and thus swelled state, which results in surprisingly effective blocking of further water transport in the longitudinal direction of the cable.

Advantageously, the use of a glue, adhesive and/or bonding agent for the bonding of the absorbent material with the layer is not necessary. As a result of this, an additional method step, namely fixing of the absorbent material with the layer, can be omitted. Thermal fixing of the absorbent material is also not necessary.

With the method according to the invention, the absorbent material can be introduced directly into the textile layer and bonded therewith. As a result, targeted control of the liquid absorption and swelling of the absorbent material takes place and self-sealing closure of the pores within the layer.

A further advantage of the method according to the invention is that because of the polymerization, the absorbent material has good adhesion within the layer and the textile fabric produced according to the method is characterized by elevated abrasion resistance.

According to the invention, a wetting agent is understood to mean natural or synthetic substances which in solution or in mixtures lower the surface tensions of water or other liquids, so that these can better penetrate into surfaces of solid bodies, such as the layer, and with displacement of air can impregnate and wet them.

A wetting agent is preferably selected from the group consisting of: glycerin, propylene glycol, sorbitol, trihydroxystearin, phenol, acid resin, phospholipids, ethylene oxide/fatty alcohol ethers, ethoxylates of propylene oxide with propylene glycol, esters of sorbitol and glycerin and mixtures thereof.

Particularly preferably, a compound of the following formula

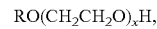

$$RO(CH_2CH_2O)_xH,$$

is used as the wetting agent, wherein R is a linear or branched alkyl residue and wherein x=4, 5, 6.3, 6.5, 7, 8, 9, 10 or 11, preferably 6.5, 7, 8, 9 or 10, in particular 6.5, 7, 8 or 9. Practical experiments have shown that with the use of such a wetting agent the surface tension of the mixture is particularly effectively lowered, as a result of which the penetration of the mixture into the textile layer is facilitated. This results in excellent adhesion between the absorbent material and the layer.

According to the invention, an alkyl residue is a saturated, aliphatic hydrocarbon group with 1 to 30, preferably 3 to 20, more preferably 4 to 17 and in particular 6 to 11 carbon atoms. An alkyl group can be linear or branched and is optionally substituted with one or several aliphatic, in particular saturated, hydrocarbon groups with 1 to 4 hydrocarbons.

Practical experiments have shown that with a content of the wetting agent based on the total quantity of the mixture in the range from 0.1 to 5 wt. %, preferably from 1 to 4 wt.

%, in particular from 1.5 to 3.5 wt. %, particularly uniform and homogeneous wetting of the layer takes place.

Particularly good results as regards the wetting of the layer were achieved with the addition of a wetting agent which sets a surface tension according to DIN 55660 of the mixture in the range from 10 to 72 dyn, preferably in the range from 15 to 60 dyn, in particular in the range from 20 to 68 dyn.

Cross-linking comprises reactions in which a large number of individual macromolecules are linked into a three-dimensional network. The linking can be achieved either during the building of the macromolecules or by reactions on already existing polymers.

Through the cross-linking process, the properties of the cross-linked substances can change. The change increases with an increasing degree of cross-linking. The degree of cross-linking is a quantitative measure for the characterization of polymeric networks. The degree of cross-linking is calculated as the quotient of a mole number of cross-linked basic building blocks and a mole number of basic building blocks in total present in the macromolecular network. It is stated either as a dimensionless number or in percent (mass proportion).

The cross-linker used according to the invention binds or cross-links the monomers or oligomers together in places by chemical bridges. This bridge formation can decrease the water insolubility of the absorbent material. On penetration of liquid into the absorbent material, this swells up and tightens this network at the molecular level—the pores close and seal themselves. As a result, penetration or passage of liquid through the pores can be prevented.

The cross-linker used in the method according to the invention advantageously has at least two reactive functional groups, which can react with functional groups of the polymerizable monomers or oligomers during the polymerization.

Advantageously, the cross-linker has at least one olefin, carboxyl, and/or carboxylate group. The cross-linkers are preferably selected from the group consisting of:

ethylene glycol bisacrylate, diethylene glycol dimethacrylate, polyethylene glycol dimethacrylate, propylene glycol dimethacrylate, polypropylene glycol dimethacrylate, tetramethylolmethane trimethacrylate, N-methylolacrylamide, glycerin trimethacrylate, glycidyl methacrylate, N,N'-methylenebismethacrylamide, diallyl maleate, diallyl phthalate, diallyl terephthalate, triallyl cyanurate, triallyl isocyanurate, triallyl phosphate, dipentaerythritol hexaacrylate, polyethylene glycol diglycidyl ether, di- or polyglycidyl ethers of aliphatic, polyvalent alcohols, ethylene glycol glycidyl ether, myrcene and mixtures thereof.

Particularly preferred cross-linkers are triethylene glycol dimethacrylate, ethylene dimethacrylate, 1,1,1-trimethylpropane triacrylate, 1,3,5-triallyl-1,3,5-triazine-2,4,6(1H,3H,5H)-trione, 1,3-butanediol dimethacrylate, 1,4-butanediol dimethacrylate, ethylene glycol dimethacrylate, trimethylolpropane trimethacrylate, N,N'-methylene-diacrylamide and mixtures thereof. These cross-linkers are particularly suitable for targeted control of the absorption capacity of the absorbent material, so that only a small liquid uptake is necessary for the sealing of the pores.

A degree of cross-linking in the range from $4.7 \times 10^{-5}$ to $1.9 \times 10^{-1}$, preferably from $2.3 \times 10^{-4}$ to $1.3 \times 10^{-1}$, in particular from $4.7 \times 10^{-4}$ to $4.9 \times 10^{-2}$, is preferably set. Through a high degree of cross-linking, the absorption capacity of the absorbent material is limited and the pores become closed with low liquid absorption.

According to a preferred embodiment of the invention, the proportion of the cross-linker based on the total quantity of the monomer content is 0.1 to 40.00 wt. %, preferably 0.05 to 28.00 wt. %, in particular 0.10 to 20.00 wt. %. With such a cross-linker content, the absorbent capacity of the absorbent material is high enough to be able to close the pores optimally and as rapidly as possible on contact with a liquid.

According to a further preferred embodiment, the polymerizable monomer or oligomer is selected from the group consisting of: monoethylenically unsaturated mono-carboxylic acids, in particular acrylic acid, methacrylic acid, maleic acid, fumaric acid, crotonic acid, sorbic acid, itaconic acid and cinnamic acid; monoethylenically unsaturated polycarboxylic acid anhydrides, in particular maleic anhydride; carboxylic acid salts, preferably water-soluble salts, in particular alkali metal, ammonium or amine salts; monoethylenically unsaturated mono- or polycarboxylic acids, in particular sodium meth-, trimethylamine meth-, triethanolamine meth-, sodium maleate, methylamine maleate; sulfonic acids, preferably aliphatic or aromatic vinylsulfonic acids, in particular, vinyl, allyl, vinyltoluene, styrene or methacrylsulfonic acids; 2-hydroxy-3-methacryloxypropylsulfonic acid; sulfopropyl methacrylate, sulfonic acid salts, preferably alkali metal, ammonium or amine salts of sulfonic acid group-containing monomers or oligomers; hydroxy compounds, preferably monoethylenically unsaturated alcohols, monoethylenically unsaturated ethers or esters of polyols, in particular methylallyl alcohol, alkylene glycols, glycerin, polyoxyalkylene polyols, hydroxyethyl methacrylate, hydroxypropyl methacrylate, triethylene glycol methacrylate, polyoxyethylene propylene glycol monomethyl allyl ether, wherein the hydroxy groups are optionally etherified or esterified; amides, preferably monoethylenically unsaturated vinylform-, acryl-, methacryl-, N-alkylmeth-, N,N-dialkylmethacryl-, N-hydroxyalkylmethacryl-, N-hexylacryl-, N,N-dimethylacryl-, N,N'-di-n-propylacryl-, N-methylolmethacryl-, N-hydroxyethylmethacryl-, and N,N-dihydroxyethylmethacrylamide, vinyl lactams, in particular N-vinylpyrrolidone; amino compounds, preferably amino group-containing esters, monoethylenically unsaturated mono- or dicarboxylic acids, heterocyclic vinyl compounds, in particular dialkylaminoalkyl-, dihydroxyalkylaminoalkyl- or morpholinoalkyl esters; vinylpyridines, in particular 2-vinyl-, 4-vinyl- or N-vinylpyridine, or N-vinylimidazole; quaternary ammonium salts, preferably N,N,N-trialkyl-N-methacryloyloxyalkylammonium salts, in particular N,N,N-trimethyl-N-methacryloyloxyethylammonium chloride, N,N,N-triethyl-N-methacryloyloxyethylammonium chloride, 2-hydroxy-3-methacryloyloxypropyltrimethylammonium chloride, in particular dimethylaminoethyl methacrylate, diethylaminoethyl methacrylate, morpholinoethyl methacrylate, dimethylaminoethyl fumarate and mixtures thereof. Preferred according to the invention are acrylic acid, methacrylic acid, amides and vinylsulfonic acids and mixtures thereof.

Advantageously, the content of the monomer or oligomer based on the total quantity of the mixture is 3 to 80, preferably 5 to 70 wt. %, in particular 10 to 50 wt. %. Practical experiments have found that with this monomer or oligomer content the absorbent capacity of the absorbent material, in particular of water, is sufficiently high and the textile fabric is particularly stable.

According to the invention, substances which are added to the mixture containing monomers or oligomers and wetting agents in order to enable and to start or to initiate the desired polymerization are described as initiators.

Advantageously, water-soluble azo compounds, redox systems, peroxycarboxylic acids, peroxycarboxylic acid esters, thioxanthene, thioamines, ketone peroxides, hydroperoxides, dicarbonates, oxalates, nitriles, preferably valeronitrile, anisoins, benzophenones, acetophenones, anthraquinones, benzene chromium tricarbonyls, benzoins, benzoin ethers, benzils, benzil ketals, 4-benzoylbiphenyls, phenylpropanediols, cyclopentadienyliron(II) cumene hexafluorophosphates, 10,11-dihydro-5H-dibenzo[a,d]-cyclohepten-5-ones, diphenyl(2,4,6-trimethylbenzoyl)phosphine oxides, 2-hydroxy-2-methyl-propiophenones, 4'-ethoxyacetopheones, ethylanthraquinones, 1-hydroxycyclohexyl phenyl ketones, 2-methyl-4'-(methylthio)-2-morpholinopropiophenones, phenanthrenequinones, 4-phenoxyacetophenones, triarylsulfonium hexafluoroantimonates in propylene carbonate, triarylsulfonium hexafluorophosphate salts in propylene carbonate, α-hydroxy ketones, phenyl glyoxylates, benzyl dimethyl ketals, α-aminoketones, 2,5-dimethyl-2,5-dihydroperoxy-hexane, 1,3-di-(2-hydroperoxyisopropyl)-benzene, monoacylphosphines, bisacylphosphines, phosphine oxides, metallocenes, peroxides, persulfates, permanganates, chlorites, cerium salts, iodine salts and/or hypochlorites are used as initiators; preferably 2,2'-azobis[2-(2-imidazolin-2-yl)propane dihydrochloride, azobis(2-amidinopropane) dihydrochloride, azo-bis-cyanopentanoic acid, 4-benzoyl-N,N,N-trimethylbenzenemethanaminium chloride, 2-hydroxy-3-(4-benzoylphenoxy)-3-N,N,N-trimethyl-1-propanaminium chloride monohydrate, 2-hydroxy-3-(3,4-dimethyl-9-oxo-9H-thioxanthon-2-yloxy)-N,N,N-trimethyl-1-propanaminium chloride, 2-hydroxy-1-[4-(hydroxyethoxy)phenyl]-2-methyl-1-propanone, 2-hydroxy-2-methyl-1-phenylpropan-1-one, 4-benzoyl-N,N-dimethyl-N-[2-(1-oxo-2-propenyl)oxy]ethylbenzene-methanaminium chloride, 1-[4-(2-hydroxyethoxy)-phenyl]-2-hydroxy-2-methyl-1-propan-1-one, 2,2'-azobis(4-methoxy-2,4-dimethylvaleronitrile), anthraquinone-2-sulfonic acid sodium monohydrates, bis(2,4,6-trimethylbenzoyl)-phenylphosphine oxides, dibenzenechromium, benzoamines, benzoin ethyl ether, benzoin methyl ether, benzoin isobutyl ether, 3,3',4,4'-benzophenonetetracarboxyl dianhydride, 4-phenylbenzophenone, 2-benzyl-2-(dimethylamino)-4'-morpholinobutyrophenone, 4,4'-bis(diethylamino)benzophenone, 4,4'-bis(dimethylamino) benzophenone, 4,4'-dimethylbenzil, 2,5-dimethylbenzophenone, 3,4-dimethylbenzophenone, 3'-hydroxyacetophenone, 4'-hydroxyacetophenone, 3-hydroxybenzophenone, α,α-dimethoxy-α-phenylacetophenone, 4-hydroxybenzophenone, 2-methylbenzophenone, dialkoxyacetophenones, α-hydroxyalkylphenones, α-aminoalkylphenones, 4,4'-dihydroxybenzophenones, 2,2-dimethoxy-2-phenylacetophenone, 4-(dimethylamino)benzophenone, 3-methylbenzophenone, 1-hydroxycyclohexyl phenyl ketone, 2-hydroxy-2-methylpropiophenone, 2-hydroxy-2-methylpropiophenone, 4-dimethylaminobenzophenone, 2,2-diethoxy-2-phenylacetophenone, 2,2-diethoxy-acetophenone, methyl benzoylformate, hydroxyphenylacetic acid 2-[2-oxo-2-phenyl-acetoxy-ethoxy]ethyl ester, hydroxyphenylacrylate 2-[2-hydroxy-ethoxy]ethyl ester, 2-chlorothioxanthene-9-ones, 2-benzyl-2-(dimethylamino)-1-[4-(4-morpholinyl)phenyl]-1-butanone, 2-methyl-1-[4-(4-morpholinophinyl)1-propanone, diphenyl-(2,4,6-trimethylbenzoyl)-phosphine oxide, phenyl-bis-(2,4,6-trimethyl)-benzoylphosphine oxide, ferrocene, titanocene, bis-$\eta^5$-2,4-cyclopentadien-1-yl)-bis-[2,6-difluoro-3-(1H-pyrro-1-yl)-phenyl]titanium, (4-methylphenyl)-[4-(2-methylpropyl-(4-methylphenyl)-[4-(2-methylpropyl)phenyl]-iodonium hexafluorophosphate, ammonium persulfate, potassium persulfate, camphorquinone, cymene cyclopentadienyliron hexafluorophosphate, dibenzocycloheptadienone, hydroxyacetophenones, thioxanthen-9-ones, 4,4'-dimethylbenzil, 2-ethylanthraquinone, acrylphosphine oxide, 2-methylbenzoyl formate, didecanoyl peroxide, dilauryl peroxide, dibenzoyl peroxide, di-(2-ethyl)-peroxydicarbonate, dicyclohexyl peroxodicarbonate, di-(4-tert.-butyl)-cyclohexyl peroxydicarbonate, diacetyl peroxodicarbonate, dimyristyl peroxodicarbonate, di-tert.-butyl peroxyoxalate, 2,2-azobis(2,4-dimethylvaleronitrile), 2,2-azobis(4-methoxy-2,4-dimethylvaleronitrile), 2,2'-azobis(2-methylbutyronitrile), 2,2'-azobis(N-(2-propenyl)-2-methylpropionamide, dimethyl-2,2'-azobis(2-methylpropionate), dimethyl 2,2'-azoisobutyrate, 1-hydroxy-cyclohexyl phenyl ketones, peroxycarboxylic acid esters, produced from pivalic acid, neodecanoic acid, 2-ethylhexanoic acid, tert-butyl hydroperoxide, tert.-amyl hydroperoxide, and/or cumene hydroxide, tert.-amyl hydroperoxide, cumene hydroperoxide, diacyl peroxide, hydrogen peroxide, 2-di(3,5,5-trimethylhexenoyl) peroxide, hydroxy and/or tert.-butyl peroxide, in particular bis(2,4,6-trimethylbenzoyl)-phenylphosphine oxides, 1-hydroxycyclohexyl phenyl ketones, benzophenones and/or 1-[4-(2-hydroxyethoxy)-phenyl]-2-hydroxy-2-methyl-1-propan-1-ones are used as initiators.

The content of the initiator based on the total quantity of the mixture could lie in the range from 0.1 to 3 wt. %, preferably from 0.5 to 2 wt. %, in particular from 0.7 to 1.5 wt. %.

Depending on the use field, the mixture could contain a filler. Fillers increase the volume or weight and can improve the technical properties of the mixture. The filler is preferably selected from the group consisting of: carbonates, in particular calcium carbonate, carbon blacks, in particular conductive carbon black, graphite, ion exchange resins, activated charcoals, silicates, in particular talc, clay, mica, silica, zeolites, chalk, calcium and barium sulfate, aluminum hydroxide, glass fibers and beads and wood flour, cellulose powder, perlite, cork or plastic granules, ground thermoplastics, cotton or carbon fibers, in particular ground carbon fibers and mixtures thereof. Through the addition of a filler, the permeability for liquid and/or air can be varied and the thermal and/or electrical conductivity of the material controlled.

In addition, the mixture could contain disinfectants, antioxidants, comonomers, anticorrosion agents, in particular triazoles and/or benzimidazoles, thickeners, foaming additives, defoamants, fragrances and/or active substances.

Through the polymerization from the monomers or oligomers performed in method step b), a super-absorber could be formed. Super-absorbers are characterized in that they can outstandingly bind and absorb liquid. According to the invention, a super-absorber is understood to be a polymer which is capable of taking up or absorbing a multiple of its own weight, up to 500 times, of liquids, preferably water, whereby it increases in volume.

To form the mixture, the monomer or oligomer is dissolved or emulsified, preferably in an aqueous solution. The water content in the mixture could lie in the range from 20 to 90 wt. %, preferably in the range from 30 to 80 wt. %, each based on the total quantity of the mixture. If the cross-linker is not soluble, it can be added in emulsified form. In addition, an organic solvent miscible with water can be added to dissolve or disperse the cross-linker. Next, the wetting agent and the initiator could be added.

The polymerization preferably takes place in the acidic pH range from 3 to 6, in particular from 4.3 to 5.5. Under these conditions the mixture is particularly stable.

To neutralize the acrylic acid monomer or the aforesaid acidic monomers or oligomers, a hydroxide, preferably an alkali metal hydroxide, in particular sodium, potassium or lithium hydroxide, carbonate of an alkali metal and/or ammonium hydroxide could be used. Because of their commercial availability, their price and their safety, sodium or potassium hydroxide are particularly preferably used.

The treatment of the layer with the mixture could be effected by impregnation, printing, coating and/or spraying. It is essential in the selection of the application method and setting of the particular process parameters that the air permeability and open porosity to be set according to the invention can be attained therewith. Conventional coating methods are blade coating and kiss coating. In blade coating, a coating blade usually operates against an underlay, roller, bench or the substrate itself. A coating blade is understood to mean a coating device. This could be fixed over the whole width of the fabric web. The application of the mixture can be effected with the following coating knives (coating blades): roller blade, air blade, rubber mat blade, support blade, bench blade, spiral blade and/or box-type coating bar. In kiss coating, a printing roller with a smooth surface or with etched, mechanically processed or knurled indentations on the surface is normally used. The mixture could be transferred from the printing roller onto the fabric to be coated. The indentations can have any desired size or shape and be discontinuously or continuously distributed on the surface of the printing roller.

The application of the mixture by impregnation is particularly preferred, in particular by foularding or by foam impregnation. The foularding can be performed in a single step or multiple steps, wherein a defined mixture is applied uniformly per $m^2$ textile material. In foularding, a liquor is pressed into a textile fabric by roller pressure. The term liquor here designates the entirety of all its components, that is the solvent, preferably water, and all dissolved, emulsified or dispersed constituents contained therein such as dyes, particles, pigments, chemicals and additives.

The quantity of the mixture applied for the impregnation, coating or spraying of the layer can vary in a wide range. Usually quantities in the range from 10 to 2500 $g/cm^2$, in particular from 50 to 1200 $g/cm^2$ are incorporated into the fiber structure of the layer.

After the impregnation, coating or spraying, the layer can be squeezed out between two rollers and/or cylinders. Practical experiments have shown that with a squeezing pressure in a range from 0.5 to 8 bar, preferably in a range from 1 to 3 bar, the quantity applied can be optimally set and a homogeneous distribution of the mixture applied in the fiber structure of the layer takes place.

Then, in a next step, the polymerization or curing of the monomers or oligomers can take place, as a result of which the absorbent material is formed. Depending on the initiator used and the reaction conditions, the polymerization can be initiated autocatalytically, thermally, by the action of ionizing radiation or by means of plasma. The monomer or oligomer is preferably polymerized in presence of ultraviolet radiation.

UV curing could be effected using a UV lamp. Irradiation intensity and time are based on the composition of the mixture and the state of the layer. Particularly good results are achieved with an irradiation intensity in the range from 40 to 400 watt/cm, preferably in the range from 100 to 250 watt/cm with an irradiation time in the range from 0.1 to 120 seconds. The UV curing is advantageously performed under vacuum or in the presence of an inorganic gas, preferably nitrogen, helium or argon, or in air.

Thermal curing could take place in an oven, in air or in an inert atmosphere or under vacuum. It is also possible to polymerize or to cure the applied mixture in a dryer, such as a tunnel dryer or an infrared dryer. Usually, the polymerization or curing takes place in a temperature range from 40 to 100° C.

Against this background, it is also conceivable to use electron beams to cure the mixture. Usually curing takes place at an energy dosage in the range from 1 to 16 megarad, preferably in the range from 2 to 8 megarad.

Following polymerization, the treated textile fabric can be subjected to one or more washing steps. Thereby, impurities, for example unconverted monomer, uncross-linked polymer, additives or auxiliary agents and initiator residues can be removed from the textile fabric. Washing is preferably effected with water and can be take place continuously or discontinuously. Practical experiments have shown that the sealing action can be increased by the washing process. It is surmised that the observed increase in the sealing action is due to an averaging of the pore structure and/or reorganization of the fiber structure.

According to a preferred embodiment, a neutralization step takes place following the polymerization. For this, the textile fabric could be passed through a neutralization bath with a pH in the range from 9 to 14, preferably in the range from 10 to 14, in particular in the range from 12 to 14.

For the neutralization, the hydroxides already previously mentioned, preferably alkali metal hydroxide, in particular sodium, potassium or lithium hydroxide, carbonate of an alkali metal and/or ammonium hydroxide, can be used.

After curing or polymerization, the residual liquid could be removed by further drying in the air circulation oven or with infrared lamps. According to the invention, drying is preferably performed by contactless energy input (contactless drying). Here, contactless drying is understood to mean that the energy transfer does not take place via direct contact with a heat-transferring material (for example heated rollers), but rather contactless, for example via radiation, preferably infrared or microwave radiation and/or via hot air as heat-transfer medium, in particular circulating air or ventilation air. Contactless drying has been found advantageous since a sealing of the surface caused by the direct contact with a heat-transfer material can be avoided. Usually, drying temperatures in the range from 60° C. to 180° C. have been found suitable for most materials.

It is also conceivable to subject the textile fabric to a subsequent treatment or finishing of a chemical nature, such as for example an anti-pilling treatment, hydrophilization, an antistatic treatment, a treatment to improve fire resistance and/or to alter the tactile properties or the gloss, a treatment of a mechanical nature such as roughening, sanforizing, smoothing or a treatment in the tumbler and/or a treatment to change the appearance such as dyeing or printing. Further, for many use purposes it can be advantageous subsequently to treat or provide the textile fabric with one or more additives, for example selected from carbonates, in particular calcium carbonate, carbon blacks, in particular conductive carbon black, graphites, ion exchange resins, activated charcoals, silicates, in particular talc, clay, mica, silica, zeolites, chalk, calcium and barium sulfate, aluminum hydroxide, glass fibers and beads and wood flour, cellulose powder, super-absorber in powder form, perlite, cork or plastic granules, ground thermoplastics, cotton or carbon fibers, in particular ground carbon fibers and mixtures thereof. Through the addition of a filler and/or additive, for example the permeability for liquid and/or air can be varied and the thermal and/or electrical conductivity of the material controlled. To improve the adhesion of the additive and/or filler, an adhesive can be used, for example based on polyvinyl alcohol, polyacrylates, polyurethanes, styrene-butadiene rubber or nitrile-butadiene rubber.

On account of its ability effectively to prevent the spreading of water along the longitudinal axis of the cable, its low weight and its high flexibility, the textile fabric according to the invention is outstandingly suitable as a sealing element in and/or around cables, for example (power-conducting underground and undersea cables) of a wide variety of voltage ranges. According to a particularly preferred embodiment of the invention, the textile fabric is present in the cable as a wrapping or bandage. According to a particular embodiment of the invention, the textile fabric is used as a sealing element of cavities in the conductor area and/or shielding area and/or in the area of the sheathing of cables.

Thus the fabric according to the invention for cables can be used for example in the shielding area—above and/or below the shielding components (for example metal (copper or aluminum) wires, sheets, tapes and metal sheaths). This embodiment is particularly advantageous with cables in the middle voltage range (1 to 1150 kV).

According to a further preferred embodiment, the fabric is used in the conductor area of cables. Thus for example the positioning of the fabric is in the segmented conductor, as sheathing of the conductor segments, in the conductor segments, as sheathing of the whole conductor, cut into tapes and/or spun into a yarn as sealing along the open channels in the conductor area. This embodiment is particularly advantageous with cables in the high and very high voltage range (60 to 1150 kV). In these cable types, the fabric is advantageously additionally introduced in the shielding area, for example above and below the screening components (metal (copper or aluminum) wires, sheets, tapes and metal sheaths).

According to a further preferred embodiment of the invention, the fabric is used as sheathing of individual cables, cable bundles and of the conductor core or cut into tapes and/or spun into a yarn as a sealant along the open channels in cable bundles as a cable filling. This embodiment is particularly preferred in data, signal, glass fiber and telecommunications cables.

In undersea cables, the positioning within the sheathing is possible as a further use area alternatively or preferably in addition to the aforesaid use areas.

A preferred embodiment of the invention relates to the use of a textile fabric according to the invention as a sealing element of cavities in data, signal, glass fiber and telecommunications cables and cables for power transmission. Use in cables for power transmission is especially preferred.

A further preferred embodiment of the invention relates to the use of a textile fabric according to the invention in band form and/or spun into a yarn as sealing along the open channels in individual cables, cable bundles and/or between cable layers and/or as sheathing of individual cable layers.

A further preferred embodiment of the invention relates to the use of a textile fabric according to the invention as a sealing element of cavities in and/or over the conductor, over and/or under the shielding, and in and/or over and/or under the sheathing of cables for power transmission.

A further preferred embodiment of the invention relates to the use of a textile fabric according to the invention above and/or below the shielding component of cables and/or in the conductor area as sheathing of the conductor core and/or one or more of the conductor segments of a segmented conductor and/or within the conductor core or the conductor segments, cut into tapes and/or spun into a yarn as sealing along the open channels in the conductor area.

FIG. 1 shows a textile fabric 1, comprising at least one layer 2, which is at least partially covered by an absorbent material 3 and has pores 4, wherein the pores 4 under the action of liquid can at least partially be sealed because of swelling of the absorbent material 3.

The absorbent material 3 is at least in some areas bonded to the textile layer 2.

The pores 4 and the size of the pores 4 are statistically randomly distributed. The geometric structure of the pores 4 is random. The pores 4 are not regularly structured geometrical bodies such as squares or octahedra, but are open-celled or closed interstices which are separated from one another by fibers 5 or the absorbent material 3.

The textile layer 2 consists of a chemically bonded nonwoven.

The textile layer 2 in FIG. 1 contains polyester fibers 5.

The absorbent material 3 in FIG. 1 covers the fibers 5 essentially completely.

The textile fabric 1 in FIG. 1 has a thickness of 0.5 mm.

The textile fabric 1 in FIG. 1 has a weight per unit area of 100 g/m$^2$.

Figure 2:
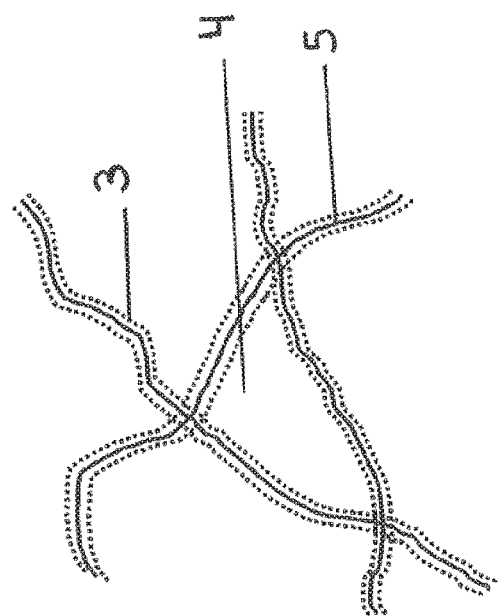
FIG. 2 is a detailed view of the textile fabric shown in FIG. 1 in the dry state.

FIG. 2 is a detailed view of the textile fabric 1 shown in FIG. 1 in the dry state. This textile fabric 1 comprises at least one layer 2, which is at least partially covered by an absorbent material 3 and has pores 4, wherein the pores 4 under the action of liquid can at least partially be sealed because of swelling of the absorbent material 3. The absorbent material 3 is in some areas bonded to the textile layer 2.

The fibers 5 of the layer 2 are completely covered or coated with the absorbent material 3.

The ventilation aperture 4 shown in FIG. 2 is completely opened.

Figure 3:
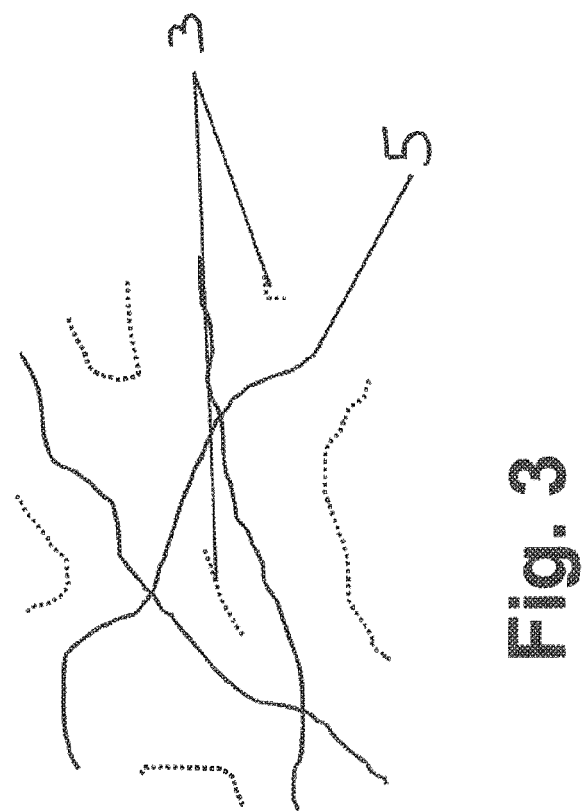
FIG. 3 is a detailed view of the textile fabric shown in FIG. 1 under the action of liquid.

FIG. 3 is a detailed view of the textile fabric 1 shown in FIG. 1 under the action of liquid. The penetrating liquid is absorbed by the absorbent material 3. The swelled absorbent material 3 fills the ventilation aperture 4, shown in FIG. 2, completely and seals this against the passage of liquid and/or a gas.

Figure 4:
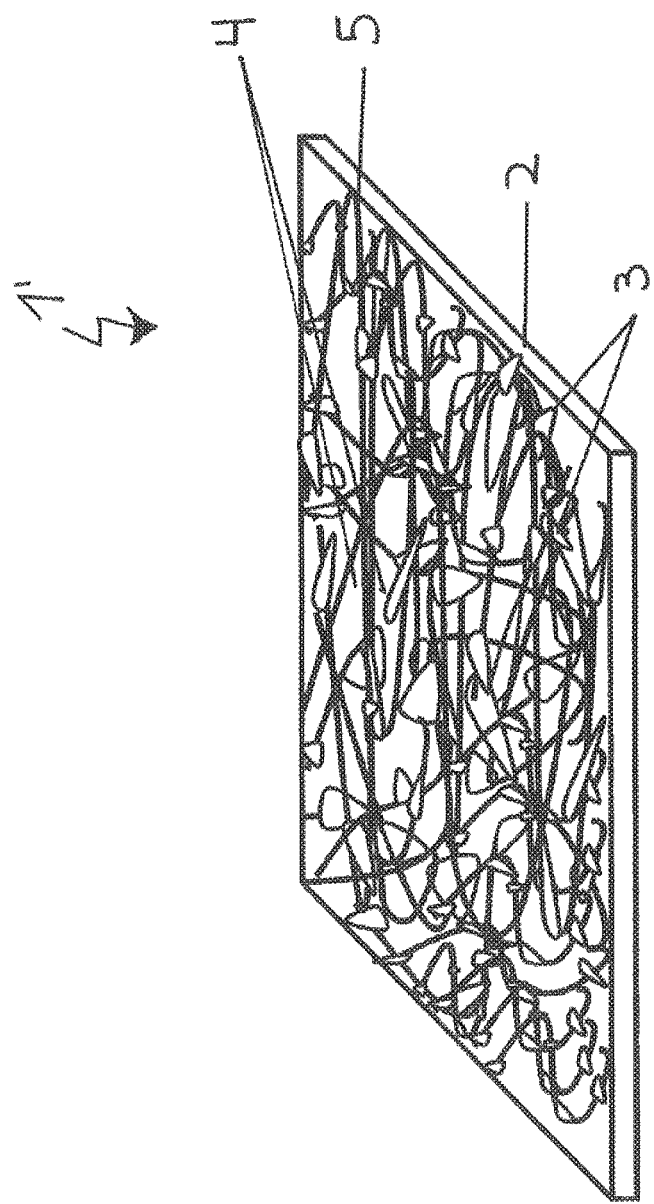
FIG. 4 is a schematic view of a textile fabric with partial coating.

FIG. 4 shows a textile fabric 1', comprising at least one layer 2, which is at least partially covered with an absorbent material 3 and has pores 4, wherein the pores 4 under the action of liquid can at least partially be sealed because of a swelling of the absorbent material 3.

The absorbent material 3 is at least in some areas bonded to the textile layer 2.

The absorbent material 3 covers the fibers 5 partially.

The pores 4 are uniformly distributed in the layer 2.

The textile fabric 1', shown in FIG. 4, has a weight per unit area of 100 g/m$^2$.

Figure 5:
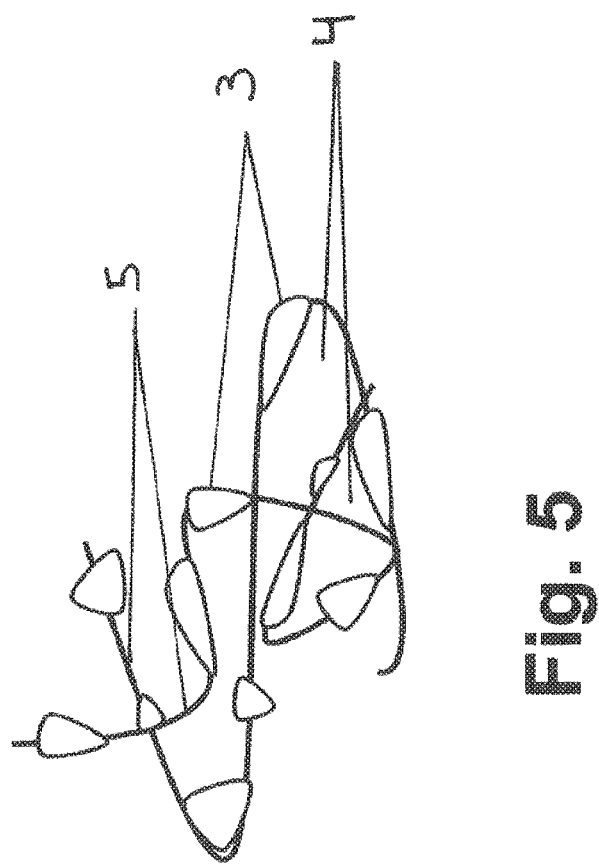
FIG. 5 is a detailed view of the textile fabric shown in FIG. 4 in the dry state.

FIG. 5 is a detailed view of the textile fabric 1' shown in FIG. 4 in the dry state. The absorbent material 3 is in some areas bonded to the textile layer 2.

The pores 4 are open.

Figure 6:
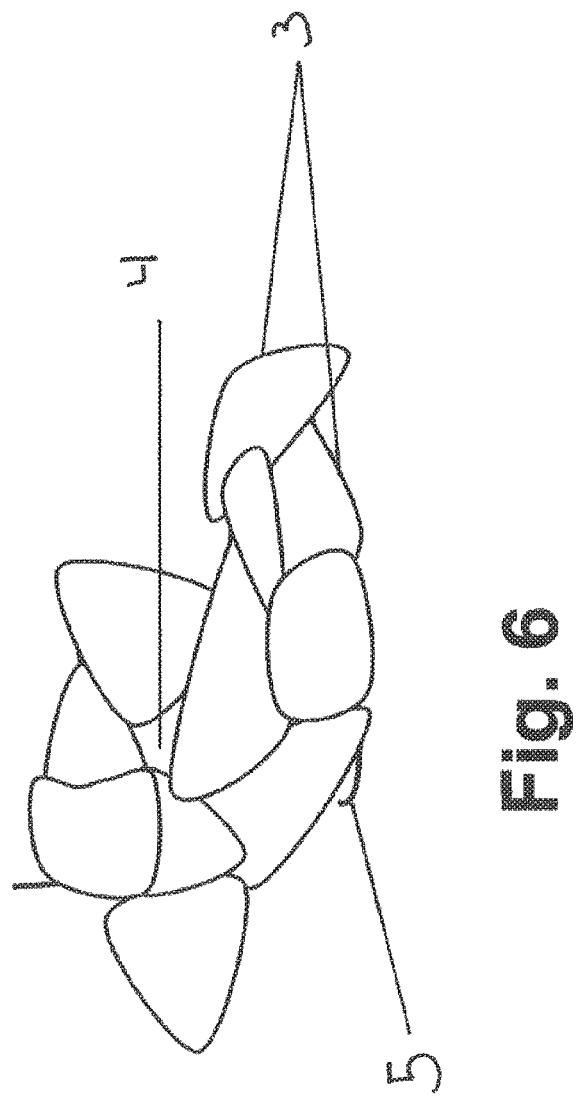
FIG. 6 is a detailed view of the textile fabric shown in FIG. 4 under the action of liquid.

FIG. 6 is a detailed view of the textile fabric 1' shown in FIG. 4 under the action of water.

The water penetrating is absorbed by the absorbent material 3 with a volume increase. Through swelling of the absorbent material 3, the ventilation aperture 4 is partially sealed.

The thickness of the textile fabric 1' shown in FIG. 4 has increased 3-fold under the action of water.

Figure 7:
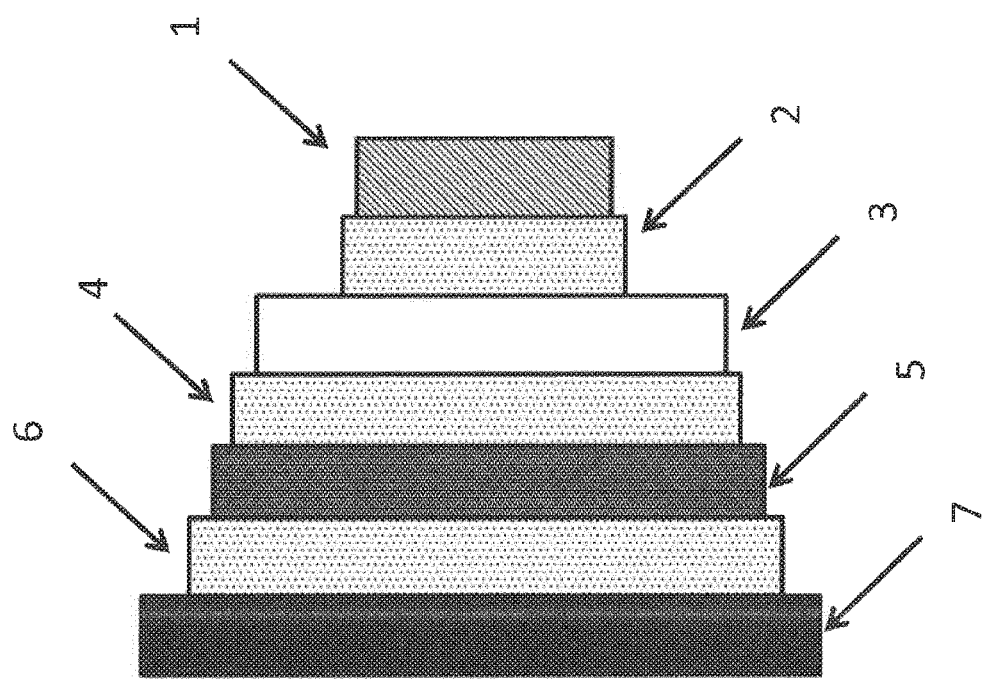
FIG. 7 is a schematic representation of the layer-wise structure of a cable for power transmission.

FIG. 7 is a schematic representation of an example of a layered structure of a cable for power transmission. Cable layer 1 is the conductor, which can be built up of individual wires or conductor segments. As cable layer 2 in FIG. 7, a textile fabric according to the invention is used as a sealing layer. Cable layer 3 is an insulating layer of polyethylene, which in the present case is multilayer structured. As cable layer 4 in FIG. 7, a textile fabric according to the invention is used as a sealing layer. Cable layer 5 is the shielding. As cable layer 6 in FIG. 7, a textile fabric according to the invention is used as a sealing layer. Cable layer 7 is the cable sheathing. Not shown in the diagram is the reinforcement. This could be positioned underneath the cable sheathing.

The textile fabric thus described can be produced according to the following practical examples:

Practical Example 1

For the production of a partially neutralized acrylic acid solution, 8.00 g of sodium hydroxide are dissolved in 21.00 g water and treated with 21.00 g of acrylic acid. Next 25.00 g of the partially neutralized acrylic acid solution are homogeneously mixed with 0.50 g of 1-[4-(2-hydroxyethoxy)-phenyl]-2-hydroxy-2-methyl-1-propan-1-one, 1.00 g of heptyl polyethylene glycol ether ($C_7H_{15}O(CH_2CH_2O)_{6.5}H$) and 47.00 g water. The pH of the solution is ca. 4.

0.25 g of N,N'-methylenediacrylamide are added to the solution and this is stirred for 15 minutes at a temperature of ca. 22° C. The solution obtained is placed in the Foulard at 20° C. Next, as base material, a 10×10 cm polyethylene terephthalate fleece with a weight per unit area of 40 g/m$^2$ (longitudinally laid, chemically bonded, air permeability greater than 1500 dm$^3$/(m$^2$s) at 100 Pa air pressure difference, thickness 0.2 mm) is introduced and drawn through the Foulard (Sawafill 1122, Sandler Co.). 180 g/m$^2$ are incorporated into the fiber structure of the layer.

The impregnated fleece is squeezed between two rollers and the polymerization of a mixture, containing acrylic acid, a cross-linker, a wetting agent and an initiator, is started by UV treatment. The UV treatment is effected by switching on UV lamps (Dr Hönle Co., type Uvahand 250, 250 W per lamp). The irradiation time is 10 seconds. The degree of cross-linking of the absorbent material is about 0.011. The irradiated fleece is washed with water and dried for four hours at 70° C.

The weight per unit area of the textile fabric produced in practical example 1 is 65 g/m$^2$.

The swelling rate defines the quantity of water which is absorbed by the textile fabric within a defined time period, with this value relating to the dry weight of the textile fabric.

The swelling rate is determined by measurement of the weight increase in time periods from 0 to 20 minutes. The weight per unit area after the swelling is about 1800 g/m$^2$.

The thickness of the textile fabric produced in practical example 1 is 0.3 mm. Its tensile strength is 150 N/5 cm, and its air permeability is 1800 dm$^3$/(m$^2$s) at 100 Pa air pressure difference.

Reference Example 1

A further textile fabric was produced according to the procedure from example 1. However, in contrast thereto, a thermally bonded polyethylene terephthalate nonwoven with an air permeability of less than 500 dm$^3$/(m$^2$s) is used. As a result, a fabric according to the invention with an air permeability of 120 dm$^3$/(m$^2$s) is obtained.

Practical Example 2

In order to simulate the blocking of water transport along cavities in the cable, the longitudinal impermeability produced by a textile fabric with constant gap height was investigated. The experiment takes place on the basis of test methods which are performed on finished underground or undersea cables. In these experiments, cables are provided with a hole in the side and a water pressure of 1 m water column applied. After a defined time, the cable is opened and the run width of the water analyzed.

The experimental setup used here is described as follows: as a base plate, a rectangular plate of Plexiglas with two long sides A (each 350 mm length) and two short sides B and C (each 210 mm length) is used. On the base plate, a rectangular sample placing area is marked with two long sides A' (each 297 mm length) and two short sides B' and C' (each 210 mm length). Here the sample placing area with its short side B' coincides flush with the side B of the base plate and the sides A' are positioned equidistant to the sides A of the base plate and run parallel to these. A DIN A4 sample of the textile fabric is laid on the sample placing area. The sample placing area is surrounded by a ground groove of 1 mm depth, which runs along the sides A' and C'. A flexible silicone hose of 3 mm diameter is laid in the groove. The hose later serves for sealing against an applied covering plate. Next to the silicone hose, a rod of stainless steel of 350 mm length and 2 mm diameter (with round cross-section) is laid on each outer side A of the base plate. Next, a covering plate of Plexiglas, which corresponds in its dimensions (350 mm×310 mm) to the base plate, is placed on top. The covering and base plates are screwed firmly together in the outer region (outside the sample placing area) each by means of 3 screws/nuts per side A and a further screw/nut pair on the side B. Thereby the distance between covering plate and base plate, the gap height, is defined by the previously laid metal rods. The gap height is ca. 2 mm. Moreover, during the tightening of the screws, the resilient silicone hose is compressed so that a seal is achieved in the region of the sample placing area along the sides A' and C'. On the side B', the sample placing area is opened, which defines the subsequent run direction of introduced water from side C' in the direction of B'. Above the sample placing area, the covering plate has a rectangular opening of size 210 mm×50 mm, which with its long side closes with the side C' of the sample placing area. A box-shaped water reservoir of Plexiglas, which can be filled with 500 ml of water, is placed on the opening.

A sealing experiment is performed in two stages. In the first stage, the water reservoir is filled with 500 ml of deionized water from an opened separating funnel. The water flows into the defined gap in the region of the sample placing area. The forward flow of the water front can be followed very well through the transparent Plexiglas covering plate. If a textile fabric which is provided with an absorbent has been inserted, this swells up, the gap is blocked and the flow front of the water comes to a halt. The time until the halting of the flow front is measured and designated as the sealing time. The corresponding sealing path is defined as the average distance of the water front to the side C' and measured graphically.

In the second stage of the experiment, a 1 m high water column is applied onto the water reservoir via an attached connector. For this, a separating funnel as water reservoir is connected with the nozzle by means of a hose and attached such that the water level in the funnel is located 100 cm above the sample placing area. The advance of the flow front is then noted as a function of the measurement duration under constant water pressure.

By means of the experimental set-up described, the textile fabric according to the invention from practical example 1 is tested. As the comparison, reference example 1 is used as well as a material in which a super-absorber in powder form (mass of absorbent: 30 g/m$^2$) is applied as a coating onto a nonwoven by means of an adhesive (reference example 2).

The blocking time and blocking path of the materials are shown in Table 1. The material known from the prior art, after a sealing time of 14 s and a corresponding sealing path of 7 cm, results in a blocking of the flow front. It is found that the textile fabric according to the invention from practical example 1, characterized by an air permeability of 1800 dm$^3$/(m$^2$s), leads to a sealing of the cavity in a markedly shorter sealing time of 9 s and above all with a very much shorter sealing path of 2 cm. In contrast to this, the textile fabric from reference example 1 with an air permeability of 120 dm$^3$/(m$^2$s) exhibits no sealing against the entry of water. The water introduced flows completely through the apparatus. An explanation can be found in that the high air permeability or open porosity of the textile fabric from practical example 1 enables a very rapid uptake of the water. Associated with this are a rapid swell rate and low sealing time.

| Example | Absorbent mass [g/m$^2$] | Sealing time [s] | Sealing path [cm] |
|---|---|---|---|
| Practical example 1 | 30 | 9 ± 2 | 7 ± 1 |
| Reference example 1 | 30 | no sealing | no sealing |
| Reference example 2 | 30 | 14 ± 2 | 12 ± 1 |

The analysis of the sealing behavior under constant pressure of a water column of 1 m height is shown in Table 2.

| Example | Absorbent mass [g/m$^2$] | Flow front migration; pressure: 1 m water column [cm/day] |
|---|---|---|
| Practical example 1 | 30 | 0.5 |
| Reference example 1 | 30 | no sealing |
| Reference example 2 | 30 | 4.5 |

In reference example 2, the flow front under constant water pressure of a 1 m water column migrates at 4.5 cm per day (24 hrs). On contact with water, the water-soluble adhesive dissolves and the super-absorber powder swells. Since the adhesive has lost its function, the swelled super-absorber has also lost its anchoring on the nonwoven substrate. Under constant water pressure, the swelled super-absorber is mobile and physically migrates along the cavity. In contrast to this, the textile fabric according to the invention (practical example 1) exhibits markedly better long-term sealing under constant water pressure. The flow front migrates only 0.5 cm per day (24 hrs). The reason for this is the very much better anchoring of the absorbent in the base material. Owing to the high air permeability of 1800 dm$^3$/(m$^2$s), for the textile fabric according to the invention there is a very large contact surface between the absorbent and the nonwoven substrate. The absorbent thus surrounds the fibers of the textile layer partly with bonding, which leads to excellent anchoring and very good sealing performance.

Practical Example 3

In order to investigate the effect of various types of drying, i.e. contact drying and contactless drying, the fabric produced in practical example 1 was dried once with hot air and once with a heated cylinder dryer. It was found that with the use of the cylinder dryer marked sealing of the surface of the fabric occurred, which was reflected in a significant decrease in the air permeability. The results are shown in the following table.

| Example | Air permeability [dm$^3$/(m$^2$s)] |
|---|---|
| Practical example 1, contact drying | 260 |
| Practical example 1, contactless drying | 1800 |

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:
1. A cable, the cable comprising
at least one of a conductor or a glass fiber, and
a sealing element comprising a textile fabric for preventing penetration and water spreading in the cable, the textile fabric comprising:
a textile layer, at least partially covered by an absorbent material, the textile layer comprising pores configured to be at least partially closed under an effect of liquid due to a swelling of the absorbent material,
wherein the absorbent material is bonded to the textile layer at least in some areas,
wherein the absorbent material has a tensile strength in the machine direction of more than 50 N/5 cm, measured according to DIN ISO 9073-3, and
wherein the textile fabric has an air permeability according to DIN EN ISO 9237 in a dry state of more than 200 dm$^3$/(m$^2$s).

2. The cable of claim 1, wherein the textile layer comprises a fiber comprising a polyolefin, polyester, polyamide, polyvinyl chloride, polyacrylonitrile, polyimide, polytetrafluoroethylene, aramid, wool, cotton, silk, hemp, bamboo, kenaf, sisal, cellulose, soya, flax, glass, basalt, carbon, viscose, or a mixture of two or more of any of these.

3. The cable of claim 1, wherein the textile fabric has a thickness according to DIN EN 9073-2 of 0.1 to 3 mm after the absorbent material is bonded to the textile layer.

4. The cable of claim 1, wherein the textile fabric is produced by a process comprising:
   a) treating the textile layer with a mixture comprising a polymerizable monomer or oligomer and a cross-linking agent, as precursor for the absorbent material, a wetting agent, and an initiator; and
   b) polymerizing of the monomer or oligomer thereby forming a bonded connection between the absorbent material and the textile layer.

5. The cable of claim 2, wherein the fiber comprises at least one of polyphenylene sulfide, polyethylene terephthalate, polybutylene terephthalate, polyamide 6.6, or polyamide 6.0.

* * * * *